United States Patent
Bossard

(10) Patent No.: US 7,407,529 B1
(45) Date of Patent: Aug. 5, 2008

(54) SYSTEM AND METHOD FOR REDUCING THERMAL SHOCK IN A HYDROGEN DIFFUSION CELL

(76) Inventor: Peter R. Bossard, 106 Railroad Dr., Ivyland, PA (US) 18974

( * ) Notice: Subject to any disclaimer, the term of this patent is extended or adjusted under 35 U.S.C. 154(b) by 523 days.

(21) Appl. No.: 11/027,874

(22) Filed: Dec. 29, 2004

(51) Int. Cl.
*B01D 53/22* (2006.01)

(52) U.S. Cl. ............... 95/55; 95/45; 95/56; 96/4; 96/7; 96/10

(58) Field of Classification Search ............... 96/4, 96/7, 8, 10, 11; 95/45, 55, 56; 55/523, 524
See application file for complete search history.

(56) References Cited

U.S. PATENT DOCUMENTS

| | | | | |
|---|---|---|---|---|
| 3,901,668 A | * | 8/1975 | Seitzer | 95/56 |
| 3,972,695 A | * | 8/1976 | Buckley et al. | 96/10 |
| 4,422,859 A | * | 12/1983 | McGee | 95/55 |
| 4,849,155 A | * | 7/1989 | Penzhorn et al. | 95/55 |
| 4,981,676 A | * | 1/1991 | Minet et al. | 95/55 |
| 5,888,273 A | * | 3/1999 | Buxbaum | 95/56 |
| 5,931,987 A | * | 8/1999 | Buxbaum | 95/55 |
| 5,997,594 A | * | 12/1999 | Edlund et al. | 95/56 |
| 6,214,090 B1 | * | 4/2001 | Dye et al. | 95/56 |
| 6,854,602 B2 | * | 2/2005 | Oyama et al. | 95/56 |

FOREIGN PATENT DOCUMENTS

| JP | 6-171904 | * | 6/1994 |
|---|---|---|---|
| JP | 2001-314727 | * | 11/2001 |

* cited by examiner

*Primary Examiner*—Jason M. Greene
(74) *Attorney, Agent, or Firm*—LaMorte & Associates

(57) ABSTRACT

A system and method of purifying hydrogen gas. The system includes heating elements for heating the hydrogen diffusion cell to a predetermined operational temperature. A preheater is provided for heating unpurified gases that will enter the hydrogen diffusion cell. The unpurified gases are heated to the operational temperature of the hydrogen diffusion cell before entering the hydrogen diffusion cell. In this manner, the inflow of unpurified gases into the hydrogen diffusion cell does not cause any thermal shock to the hydrogen diffusion cell. The incoming unpurified gases are heated in two ways. The unpurified gases are heated in a preheater. The unpurified gases are also heated in a heat exchanger. The heat exchanger recycles the heat from the purified hydrogen gas.

12 Claims, 2 Drawing Sheets

SYSTEM AND METHOD FOR REDUCING THERMAL SHOCK IN A HYDROGEN DIFFUSION CELL

BACKGROUND OF THE INVENTION

1. Field of the Invention

In general, the present invention relates to hydrogen diffusion cells and heating systems for hydrogen diffusion cells. More particularly, the present invention relates to heated hydrogen diffusion cells that contain palladium diffusion membranes.

2. Description of the Prior Art

In industry, there are many known techniques for separating hydrogen from more complex molecules in order to produce a supply of hydrogen gas. One such technique is electrolysis, wherein hydrogen gas is obtained from water. Regardless of how hydrogen gas is obtained, the collected hydrogen gas is typically contaminated with secondary gases, such as water vapor, hydrocarbons and the like. The types of contaminants in the collected hydrogen gas are dependent upon the technique used to generate the hydrogen gas.

Although contaminated hydrogen gas is useful for certain applications, many other applications require the use of pure hydrogen. As such, the contaminated hydrogen gas must be purified. One technique used to purify hydrogen is to pass the hydrogen through a hydrogen diffusion cell. A typical prior art hydrogen diffusion cell contains one or more palladium diffusion membranes. The palladium diffusion membranes can be palladium tubing or substrate supported layers of palladium. The palladium diffusion membrane is heated and the contaminated hydrogen gas is directed through the palladium diffusion membrane. When heated, the palladium diffusion membrane is permeable to hydrogen gas but not to the contaminants that may be mixed with the hydrogen gas. As such, nearly pure hydrogen passes through the palladium diffusion membrane and is collected for use.

Prior art hydrogen diffusion cells that use palladium diffusion membranes have problems associated with thermal stress. As a palladium diffusion membrane is repeatedly heated and cooled, it expands and contracts. The larger the palladium diffusion membrane is, the more it expands and contracts. As the palladium diffusion membrane expands and contacts, cracks may occur. Cracks are particularly prevalent at contact points where the palladium diffusion membrane contacts dissimilar material. Once a crack occurs in the palladium diffusion membrane, the hydrogen diffusion cell ceases to function properly.

In addition to thermal stress caused by normal operational heating and cooling, the palladium diffusion membrane in hydrogen diffusion cells are often subject to thermal shock. In the normal operation of a hydrogen diffusion cell, the hydrogen diffusion cell is heated to its operational temperature. Hydrogen gas is then introduced into the hydrogen diffusion cell. The incoming hydrogen gas is typically at a temperature that is much lower than the operational temperature of the hydrogen diffusion cell. The hydrogen gas rapidly chills the palladium diffusion membrane in the hydrogen diffusion cell, causing it to contract. However, the hydrogen gas heats rapidly and the palladium diffusion membrane quickly expand. This rapid contraction and expansion stresses the palladium diffusion membrane and is a root cause of failure of many hydrogen diffusion cells.

A need therefore exists for a system for regulating the temperature of a hydrogen diffusion cell so that thermal stresses experienced by the hydrogen diffusion cell are reduced. This need is met by the present invention as it is described and claimed below.

SUMMARY OF THE INVENTION

The present invention is a system and method of purifying hydrogen gas with a hydrogen diffusion cell in a manner that limits thermal stress to the hydrogen diffusion cell. The system includes heating elements for heating the hydrogen diffusion cell to a predetermined operational temperature. A preheater is provided for heating unpurified gases that will enter the hydrogen diffusion cell. The unpurified gases are heated to approximate the operational temperature of the hydrogen diffusion cell before entering the hydrogen diffusion cell. In this manner, the inflow of unpurified gases into the hydrogen diffusion cell does not cause any thermal shock to the hydrogen diffusion cell.

The incoming unpurified gases are heated in two ways. The unpurified gases are heated in a preheater. The preheater contacts the same heating elements that heat the hydrogen diffusion cell and are therefore heated to the same temperature as the hydrogen diffusion cell. The unpurified gases are also heated in a heat exchanger. The heat exchanger recycles the heat from the purified hydrogen gas. The purified hydrogen gas that leaves the hydrogen diffusion cell is at the operational temperature of the hydrogen diffusion cell. The heat from the hot purified hydrogen that is leaving the hydrogen diffusion cell is exchanged with the unpurified gases that will enter the hydrogen diffusion cell. The excess heat can therefore be recycled and the system run more efficiently.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS.

Figure 1:
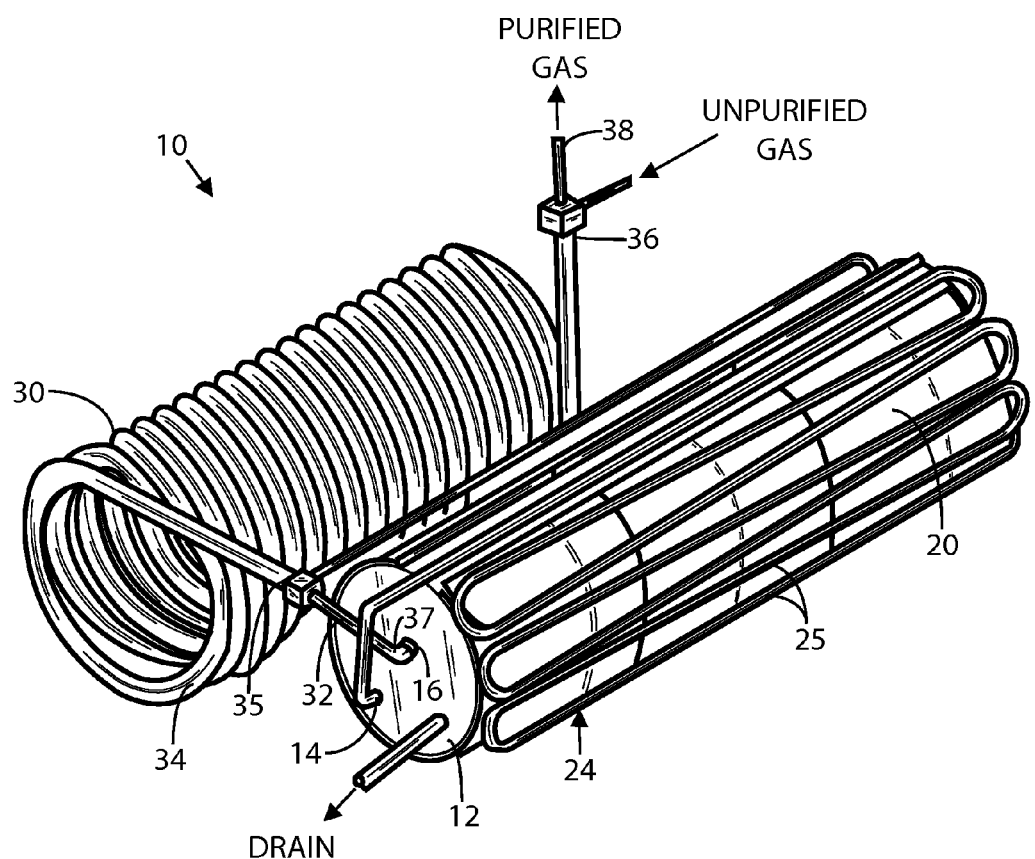
FIG. 1 is a perspective view of an exemplary embodiment of a system in accordance with the present invention.
Figure 2:
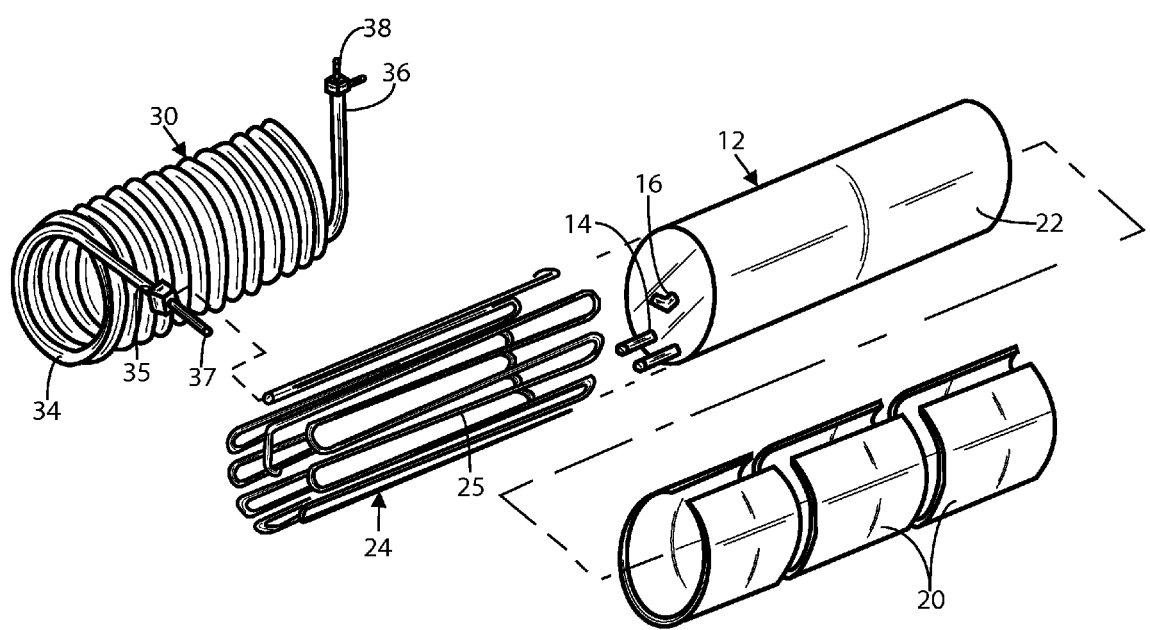
FIG. 2 is an exploded view of the embodiment of FIG. 1.

Referring to FIG. 1 in conjunction with FIG. 2, an exemplary embodiment of the present invention system 10 is shown. The shown system 10 is utilizing a prior are hydrogen diffusion cell 12. The hydrogen diffusion cell 12 shown is of the types described in U.S. Pat. No. 6,464,759 to Bossard, entitled Hydrogen Diffusion Cell Assembly And Its Method Of Manufacture, the disclosure of which is incorporated into this specification by reference. However, it will be understood that other hydrogen diffusion cells exist and that many other models of hydrogen diffusion cells can be adapted for use in the present invention system 10.

The hydrogen diffusion cell 12 has an input port 14 into which unpurified gases flows. Hydrogen gas, that is contained within the unpurified gases, is separated from the unpurified gases within the hydrogen diffusion cell 12. The hydrogen diffusion cell 12 also has an output port 16. The purified hydrogen gas exits the hydrogen diffusion cell 12 through the output port 16.

Most hydrogen diffusion cells have an operational temperature of at least 300 degrees centigrade. To heat the hydrogen diffusion cell 12 to the operational temperature, heating elements 20 are provided. The heating elements 20 contact the exterior housing 22 of the hydrogen diffusion cell 12, thereby heating the hydrogen diffusion cell 12 from the outside in.

A preheater 24 is provided. The shown preheater 24 is a coil of tubing 25 that is bent in a serpentine fashion. The tubing 25 has long straight sections in between bends. The long straight sections of the tubing 25 run along the length of the heating elements 20 and the below lying housing 22 of the hydrogen diffusion cell 12. The tubing 25 of the preheater 24 contacts the heating elements 20. As a consequence, the heating elements 20 heat both the hydrogen diffusion cell 12 and the tubing 25 of the preheater 24.

The tubing 25 of the preheater 24 has a first end 26 that connects to the input port 14 of the hydrogen diffusion cell 12. Thus, any gas that may enter the hydrogen diffusion cell 12 must first pass through the tubing 25 of the preheater 24. The unpurified gases entering the hydrogen diffusion cell 12 will therefore be heated as they pass through the tubing 25 of the preheater 24.

The heating elements 20 are set at a temperature that brings the hydrogen diffusion cell 12 to its desired operational temperature. Since the tubing 25 of the preheater 24 contacts the same heating elements 20, the heating elements 20 also heat the preheater 24 to the operational temperature of the hydrogen diffusion cell 12. The length of the tubing 25 of the preheater 24 is calculated so that unpurified gases flowing through the preheater 24 will heat to the temperature of the preheater 24 by the time the unpurified gases exit the preheater 24. As a result, the unpurified gases exiting the preheater 24 and entering the hydrogen diffusion cell 12 are already at the operational temperature of the hydrogen diffusion cell 12. The unpurified gases entering the hydrogen diffusion cell 12 therefore do not have any significant thermal effects on the hydrogen diffusion cell 12. The hydrogen diffusion cell 12, therefore, does not experience any significant thermal stresses as a result of cool unpurified gases entering the hydrogen diffusion cell 12.

The presence of the preheater 24 around the heating elements 20 acts as a heat sink. The tubing 25 of the preheater 24 absorbs heat from the heating elements 20 that radiates outwardly from the heating elements 20. As a result, less insulation is needed to contain the collateral heat of the heating elements 20. The use of the preheater 24, therefore, enables the heated hydrogen diffusion cell 12 to be placed in smaller areas than was previously possible with prior art systems.

The unpurified gases entering the hydrogen diffusion cell 12 are preheated to the operational temperature of the hydrogen diffusion cell 12 by the preheater 24. The unpurified gases remain at that operational temperature as they are processed within the hydrogen diffusion cell 12. As a consequence, the purified hydrogen gas that leaves the output port 16 of the hydrogen diffusion cell 12 is also at the operational temperature of the hydrogen diffusion cell 12.

There is no reason that the purified hydrogen gas leaving the hydrogen diffusion cell 12 must remain hot. In fact, more purified hydrogen gas can be stored in a storage tank if the purified hydrogen gas being stored is cool. To help cool the purified hydrogen gas as it exits the hydrogen diffusion cell 12, a heat exchanger 30 is provided. In the shown embodiment, the heat exchanger 30 is a double coil of tubing. The double coil of tubing is comprised of a small diameter tube 32 that is concentrically placed within a larger diameter tube 34. The two tubes 32, 34 are then formed together into a coil to conserve space. The large diameter tube 34 has a first end 35 and a second end 36. Similarly, the small diameter tube 32 has a first end 37 and a second end 38.

The first end 35 of the large diameter tube 34 is connected to the source of unpurified gases. The second end 36 of the large tube 34 is connected to the preheater 24. Consequently, unpurified gases travel through the large diameter tube 34 of the heat exchanger 30 and enters the preheater 24. The unpurified gases then pass through the preheater 24 and enter the hydrogen diffusion cell 12 for purification.

The second end 38 of the small diameter tube 32 connects to the output port 16 of the hydrogen diffusion cell 12. As a result, the hot purified hydrogen gas that exits the hydrogen diffusion cell 12 enters the small diameter tube 32 and flows into the heat exchanger 30. The first end 37 of the small diameter tube 32 leads to a collection facility for the purified hydrogen gas.

Since the small diameter tube 32 travels through the center of the large diameter tube 34, there is a large surface area of the small diameter tube 32 that is exposed to the gas flowing through the large diameter tube 34. The result is that the small diameter tube 32 is heated by the hot purified gas leaving the hydrogen diffusion cell 12. That heat is transferred to the unpurified gases flowing through the large diameter tube 34 as the unpurified gases flow over the small diameter tube 32. The purified hydrogen gas that flows through the small diameter tube 32 is cooled, while the unpurified gas flowing through the large diameter tube 34 is heated. The excess heat contained within the hot purified hydrogen gas is therefore recycled and utilized to warm the unpurified gas even before the unpurified gas enters the preheater 24. The unpurified gases can be raised to a temperature just under the operational temperature of the hydrogen diffusion cell 12 in this manner. The result is that thermal shock to the preheater 24 is reduced and the heat elements 20 can operate more efficiently.

There are many types of heat exchangers that can exchange heat from one flow of gas to another while keeping the two flows separate. The use of the tube-in-tube heat exchanger 30 is merely exemplary and is set forth merely as a space efficient form of a heat exchanger.

It will therefore be understood that the embodiment of the present invention system that is shown is merely exemplary and that a person skilled in the art can make many variations to the shown embodiment. For instance, the shape of the hydrogen diffusion cell is dependent upon its make and model. The size and shape of the heating elements and preheater would therefore also vary to accommodate the hydrogen diffusion cell selected. Furthermore, as has been previously mentioned, other forms of heat exchangers can be used as part of the system. All such variations, modifications and alternate embodiments are intended to be included within the scope of the present invention as set forth by the claims.

What is claimed is:

1. A system comprising:
   a hydrogen diffusion cell having an input port for receiving unpurified gas and an output port for emitting purified hydrogen;
   a heat exchanger through which both said unpurified gas and said hydrogen gas pass, wherein heat is exchanged between said hydrogen gas and said unpurified gas without said hydrogen gas and said unpurified gas mixing;
   at least one heating element for heating said hydrogen diffusion cell to a predetermined operational temperature; and
   a preheater, disposed between said heat exchanger and said hydrogen diffusion cell, for heating said unpurified gas to said operational temperature prior to said unpurified gas entering said input port of said hydrogen diffusion cell.

2. The system according to claim 1, wherein said preheater is heated by said at least one heating element that also heats said hydrogen diffusion cell.

3. The system according to claim 1, wherein said preheater includes tubing that contacts said at least one heating element, and wherein said unpurified gas passes through said tubing to reach said input port of said hydrogen diffusion cell.

4. The system according to claim 3, wherein said at least one heating element is interposed between said tubing and said hydrogen diffusion cell.

5. In a hydrogen purification system that uses a hydrogen diffusion cell, wherein the hydrogen diffusion cell separates hydrogen gas from unpurified gases, a method of thermal preparation comprising the steps of:
   heating said hydrogen diffusion cell to an operational temperature;
   introducing unpurified gases into said hydrogen diffusion cell, wherein said hydrogen diffusion cell separates hydrogen gas from said unpurified gases;
   providing a heat exchanger through which both said unpurified gas and said hydrogen gas pass, wherein heat is exchanged between said hydrogen gas and said unpurified gas without said hydrogen gas and said unpurified gas mixing; and
   providing a preheater, disposed between said heat exchanger and said hydrogen diffusion cell, for heating said unpurified gases to said operational temperature before said unpurified gases enter said hydrogen diffusion cell.

6. The method according to claim 5, wherein said step of heating said hydrogen diffusion cell includes placing at least one heating element in contact with said hydrogen diffusion cell.

7. The method according to claim 6, wherein said preheater includes tubing that contacts said at least one heating element being used to heat said hydrogen diffusion cell.

8. The method according to claim 5, wherein said heat exchanger includes passes said hydrogen gas through a first tube and passes said unpurified gases through a second tube, wherein said first tube is disposed within said second tube.

9. A method of operation for a hydrogen purification system, said method comprising the steps of:
   providing a hydrogen diffusion cell;
   heating said hydrogen diffusion cell to a predetermined operational temperature;
   providing unpurified gases to said hydrogen diffusion cell, wherein said hydrogen diffusion cell separates hydrogen gas from said unpurified gases;
   providing a heat exchanger through which both said unpurified gas and said hydrogen gas pass, wherein heat is exchanged between said hydrogen gas and said unpurified gas without said hydrogen gas and said unpurified gas mixing; and
   providing a preheater, disposed between said heat exchanger and said hydrogen diffusion cell, for heating said unpurified gases to said operational temperature before said unpurified gases enter said hydrogen diffusion cell.

10. The method according to claim 9 wherein said step of heating said hydrogen diffusion cell to a predetermined operational temperature includes bringing said hydrogen diffusion cell into direct contact with at least one heating element.

11. The method according to claim 10, wherein said preheater includes tubing that is heated by said at least one heating element.

12. The method according to claim 9, wherein said heat exchanger heats said unpurified gas to an elevated temperature below said operational temperature.

\* \* \* \* \*